(12) United States Patent
Lau et al.

(10) Patent No.: US 10,176,413 B2
(45) Date of Patent: Jan. 8, 2019

(54) INFORMATION BEARING DEVICES

(71) Applicant: EASY PRINTING NETWORK LIMITED, Kowloon, Hong Kong (CN)

(72) Inventors: Tak Wai Lau, Hong Kong (CN); Wing Hong Lam, Hong Kong (CN)

(73) Assignee: EASY PRINTING NETWORK LIMITED, Kowloon, Hong Kong (CN)

( * ) Notice: Subject to any disclaimer, the term of this patent is extended or adjusted under 35 U.S.C. 154(b) by 0 days.

(21) Appl. No.: 15/313,086

(22) PCT Filed: May 22, 2015

(86) PCT No.: PCT/IB2015/053782
§ 371 (c)(1),
(2) Date: Nov. 21, 2016

(87) PCT Pub. No.: WO2015/177765
PCT Pub. Date: Nov. 26, 2015

(65) Prior Publication Data
US 2017/0124439 A1    May 4, 2017

(30) Foreign Application Priority Data
May 22, 2014   (HK) .................................. 14104802

(51) Int. Cl.
*G06K 19/06* (2006.01)
(52) U.S. Cl.
CPC ... *G06K 19/0614* (2013.01); *G06K 19/06037* (2013.01); *G06K 19/06093* (2013.01)
(58) Field of Classification Search
CPC ...................................... G06K 19/06–19/06178
See application file for complete search history.

(56) References Cited

U.S. PATENT DOCUMENTS

| | | | |
|---|---|---|---|
| 6,373,965 B1 * | 4/2002 | Liang .................... | B41M 3/144 382/112 |
| 8,141,908 B2 * | 3/2012 | Whiteman ........... | B42D 25/369 283/114 |

(Continued)

FOREIGN PATENT DOCUMENTS

| CA | 2642330 A1 | 8/2007 |
|---|---|---|
| CN | 1689050 A | 10/2005 |

(Continued)

OTHER PUBLICATIONS

International Search Report for PCT/IB2015/053782 dated Sep. 24, 2015.

*Primary Examiner* — Christle I Marshall
(74) *Attorney, Agent, or Firm* — Nixon Peabody LLP; Jeffrey L. Costellia

(57) ABSTRACT

A tamper or copy resistant information bearing device is disclosed. The information bearing device comprises a first data bearing pattern and a second data bearing pattern in overlap. At least a portion of the first data bearing pattern overlaps with at least a portion of the second data bearing pattern to form an overlapping region comprising an overlapped data bearing pattern. At least some information bearing elements of the first type and at least some information bearing elements of the second type in said overlapping data bearing pattern are joined or connected in abutment to form a plurality of overlapped information bearing elements. An overlapped information bearing element comprises a first portion due to said information bearing element of the first type, a second portion due to said information bearing element of the second type, and a third portion due to merging or overlapping of said information bearing element of the first type and said information bearing element of the second type.

20 Claims, 9 Drawing Sheets

(56) References Cited

U.S. PATENT DOCUMENTS

| | | | | |
|---|---|---|---|---|
| 8,905,313 | B2* | 12/2014 | Rapoport | B41M 1/14 |
| | | | | 235/462.01 |
| 9,589,217 | B2* | 3/2017 | Eschbach | G06K 1/121 |
| 2004/0211844 | A1* | 10/2004 | Marshall | G06K 1/121 |
| | | | | 235/494 |
| 2010/0276887 | A1* | 11/2010 | Yoshida | A63F 1/02 |
| | | | | 273/293 |
| 2014/0119647 | A1* | 5/2014 | Cheong | G06K 9/18 |
| | | | | 382/166 |
| 2015/0151562 | A1* | 6/2015 | Whiteman | G02B 5/124 |
| | | | | 283/85 |

FOREIGN PATENT DOCUMENTS

| | | | |
|---|---|---|---|
| CN | 101364359 A | | 2/2009 |
| CN | 102473235 A | | 5/2012 |
| JP | 2013041496 A | * | 2/2013 |
| JP | 2013073447 A | * | 4/2013 |

* cited by examiner

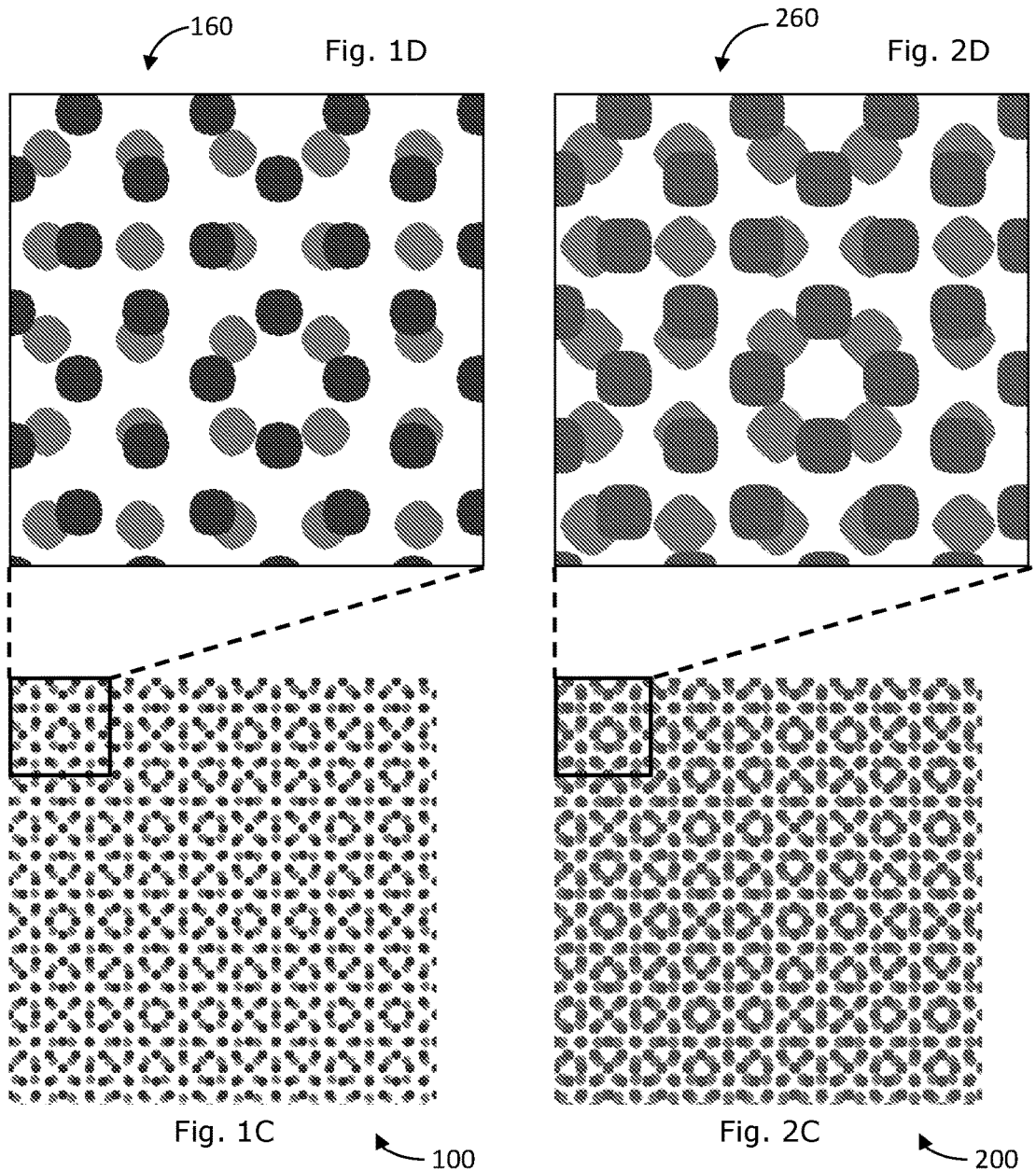

Fig. 6A1

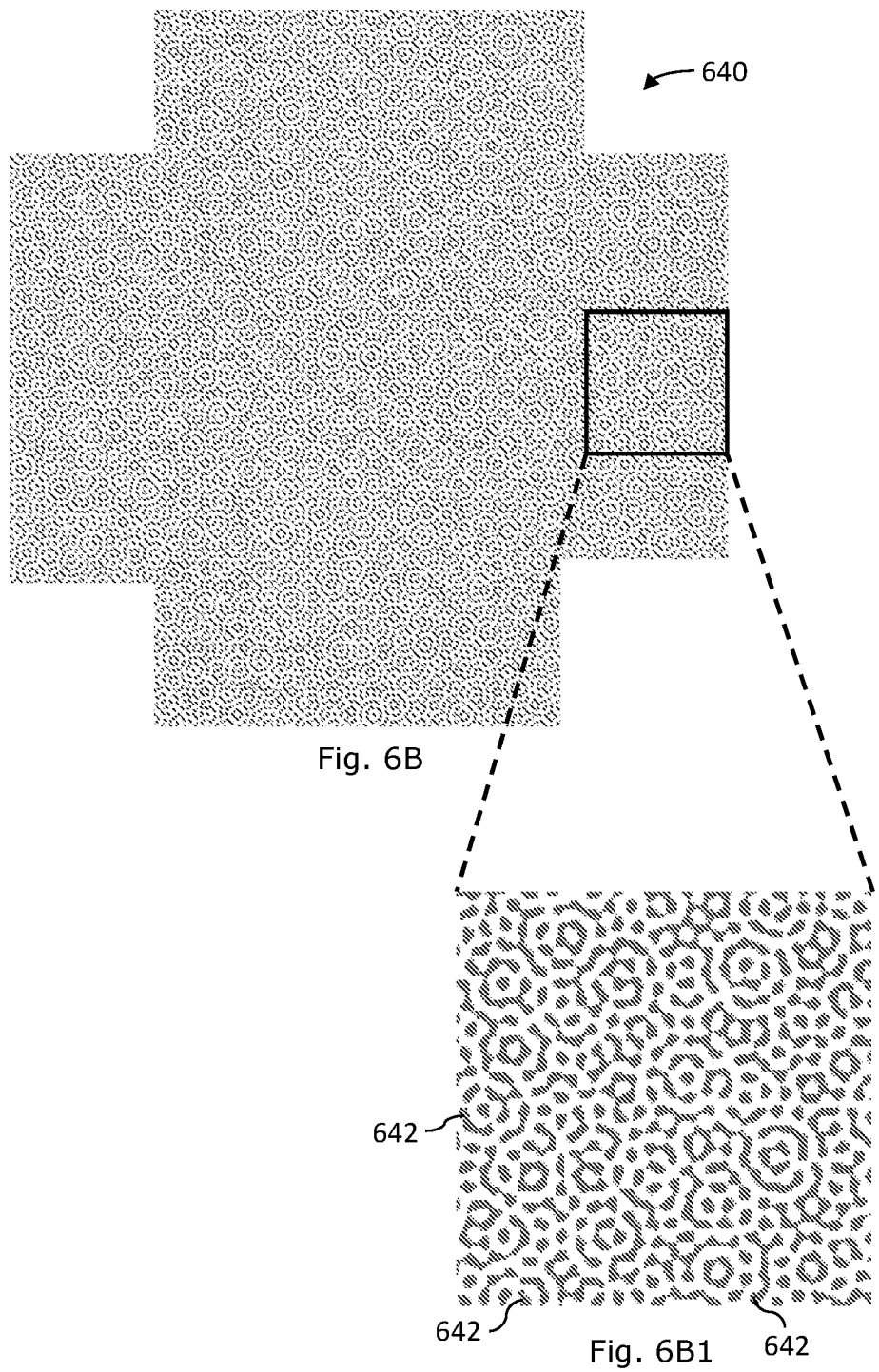

Figure 1A:
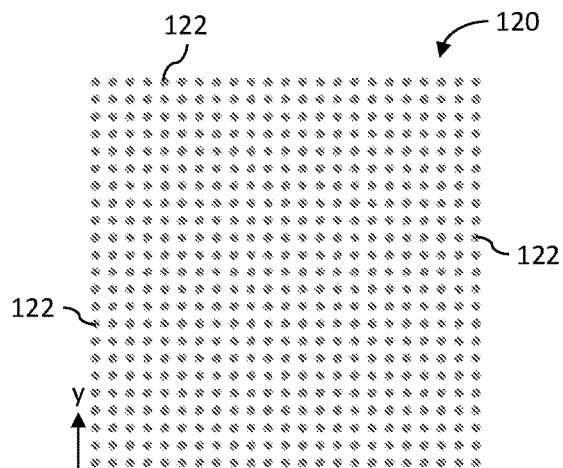
Figure 1B:
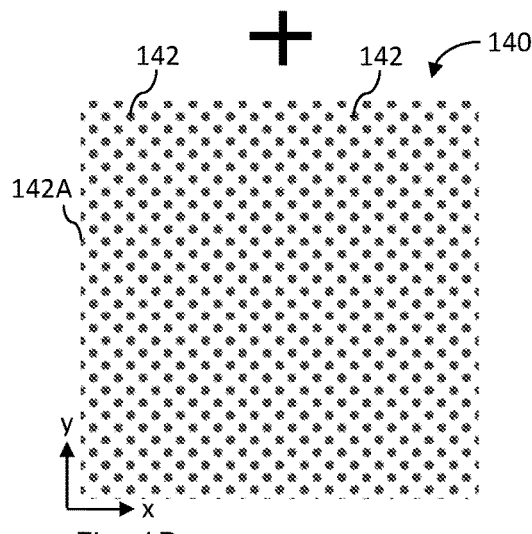
Figure 1:
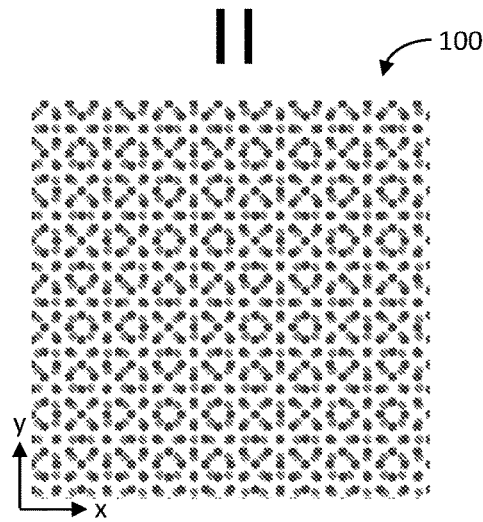

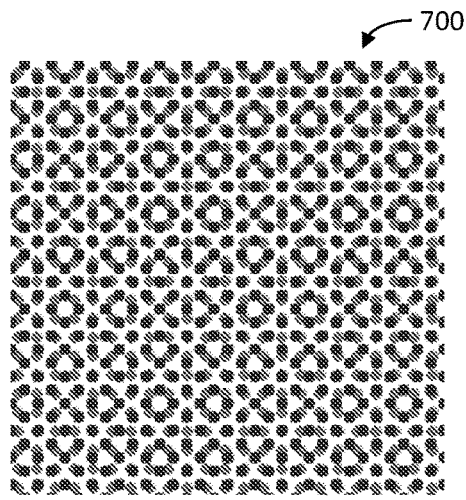
Fig. 7
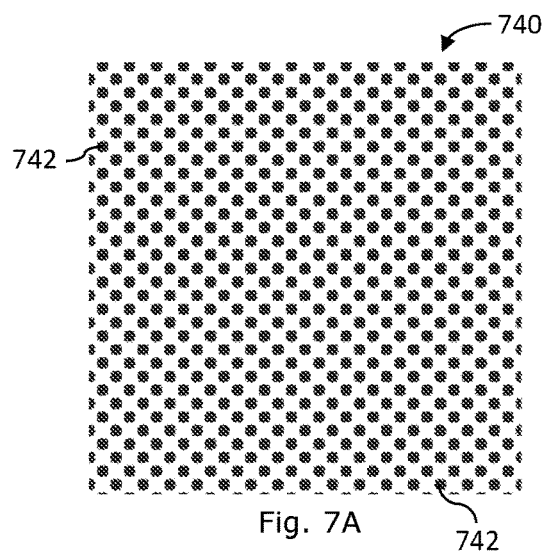
Fig. 7A
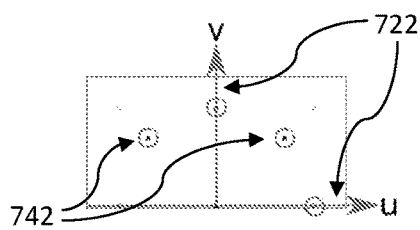
Fig. 7X
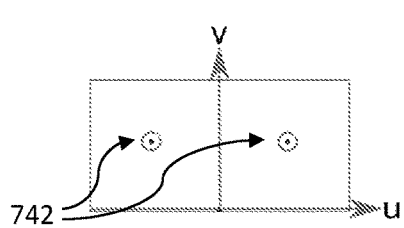
Fig. 7A1
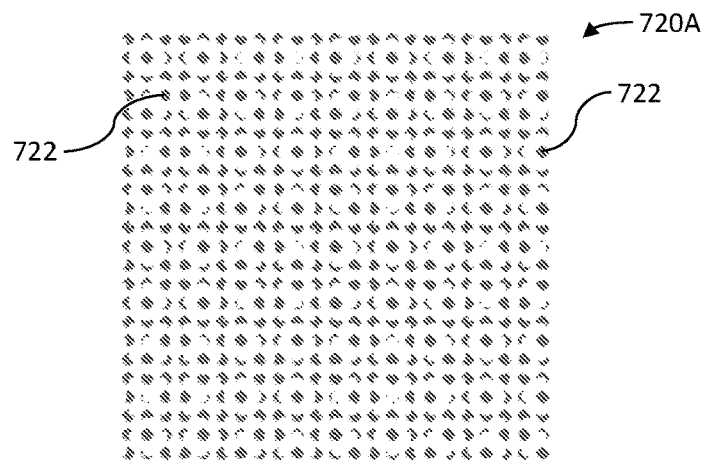
Fig. 7B
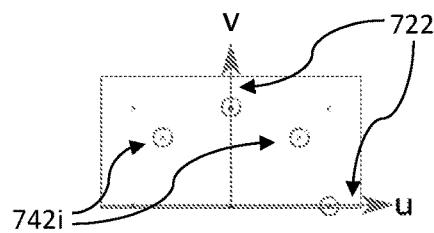
Fig. 7B1

INFORMATION BEARING DEVICES

FIELD

The present disclosure relates to information bearing devices, and more particularly to tamper resistant information bearing devices such as those comprising multiple information bearing image patterns.

BACKGROUND

Information bearing devices comprising information bearing image patterns are widely used for in identification, authentication or verification. With the advancement in image capturing and printing technologies, information bearing devices have been frequently tampered or reproduced without authorisation. Information bearing devices having enhanced anti-tampering or anti-counterfeiting features are desirable.

SUMMARY OF DISCLOSURE

A tamper or copy resistant information bearing device is disclosed.

The information bearing device comprises a first data bearing pattern and a second data bearing pattern.

The first data bearing pattern comprises a plurality of spatially distributed information bearing elements of a first type, said information bearing elements of the first type being spatially distributed to define the first data bearing pattern, the first data bearing pattern being characteristic of a first data set and the first data set relating to the first data bearing pattern by a first distribution rule.

The second data bearing pattern comprises a plurality of spatially distributed information bearing elements of a second type, said information bearing elements of the second type being spatially distributed to define the second data bearing pattern, the second data bearing pattern being characteristic of a second data set and the second data set relating to the second data bearing pattern by a second distribution rule.

At least a portion of said first data bearing pattern overlaps with at least a portion of said second data bearing pattern to form an overlapping region comprising an overlapped data bearing pattern, wherein at least some information bearing elements of the first type and at least some information bearing elements of the second type in said overlapping data bearing pattern are joined or connected in abutment to form a plurality of overlapped information bearing elements.

The overlapped information bearing element, also referred to as a 'hybrid information bearing element' or 'composite information bearing element' herein, comprises a first portion due to said information bearing element of the first type, a second portion due to said information bearing element of the second type, and a third portion due to merging or overlapping of said information bearing element of the first type and said information bearing element of the second type.

The hybrid information bearing element may comprise an information bearing element of one type overlapped with a plurality of information bearing elements of another type. The information bearing element of one type may be sandwiched between two information bearing elements of another type. The information bearing elements of another type may be on different or opposite sides of the information bearing element of the one type.

A method of forming a tamper resistant information bearing device is disclosed. The method comprises: forming a first data bearing pattern in a first area, the first data bearing pattern comprising spatially distributed information bearing elements of a first type, said information bearing elements of the first type being distributed according to a first distribution rule to represent a first set of data; and forming a second data bearing pattern in the first area, the second data bearing pattern comprising spatially distributed information bearing elements of a second type, said information bearing elements of the second type being distributed according to a second distribution rule to represent a second set of data; wherein at least a portion of said first data bearing pattern overlaps with at least a portion of said second data bearing pattern to form an overlapping region comprising an overlapped data bearing pattern; and wherein one of said first data bearing pattern or said second data bearing pattern is formed as a visually dominant data bearing pattern and the other one of said first data bearing pattern or said second data bearing pattern is formed as a visually submissive or recessive data bearing pattern such that the entirety of said visually dominant data bearing pattern is visually identifiable from said overlapped data bearing pattern and portions of said visually submissive data bearing pattern which are in overlap with the said visually dominant data bearing pattern is not visually identifiable from said overlapped data bearing pattern.

An information bearing device as disclosed herein, whether by the example method disclosed herein, has tamper or copy resistant features which make it attractive for use as an authentication device or a security device to enhance security or combat tampering or counterfeiting.

The information bearing device may comprise patterns with a high number of lines-per-inch (or elements-per-inch) so that meaningful copying of the device has to utilise a separation process in which the information bearing elements of the first and second type have to be separately extracted first and then a recombination process in which the extracted information bearing elements of the first and second type are recombined, for example, by overlaying printing.

The information bearing device may comprise patterns with elements/lines per inch exceeding 150 because typical printing resolution of a staple copier is in the region of 150 LPI or less.

The third portion includes a visible junction boundary at a junction interface between the said information bearing elements of the first type and the second type which form the hybrid information bearing element. The visible junction boundary is delineated by a boundary, or outer boundary, of a dominant or more dominant one of the information bearing element of the first type and the second type, and is inside the recessive or more recessive one of the information bearing element of the first type and the second type. No visible junction boundary due to the recessive or more recessive one of the information bearing element is visible inside the dominant or more dominant one of the information bearing element.

The information bearing element of the first type and said information bearing element of the second type are in abutment or in seamed abutment along entirety of said visible junction boundary.

The information bearing elements of the first type have a first shape and said information bearing elements of the second type may have the same shape or a second shape different to the first shape.

In some embodiment, the information bearing elements of the first type have a first colour and said information bearing elements of the second type has a second colour different to the first colour, one of the colours being a dominant colour and the other one being recessive.

In some embodiment, the information bearing elements of the first type have a first grey scale and said information bearing elements of the second type has a second grey scale different to the first grey scale, grey scales being dominant or darker and the other one being recessive or light.

A first data, a first set of data and/or a first coded message may be embedded in spatial distribution properties ("first spatial distribution properties") of said information bearing elements of the first type.

A second data, a second set of data, and/or a second coded message may be embedded in spatial distribution properties ("second spatial distribution properties") of said information bearing elements of the second type. The first spatial properties and the second spatial properties may be different in at least one spatial property.

The composite or hybrid information bearing elements may be grouped and spatially distributed to define a third data, a third set of data, and/or a third coded message or part thereof. The third data, the third set of data, and/or the third coded message or part thereof may be embedded in spatial distribution properties of said composite information bearing elements. The composite information bearing elements have non-uniform and/or irregular shapes.

The spatial properties include one or a combination of the following spatial distribution properties of said information bearing elements: repetition intervals in a first direction, repetition intervals in a second direction different to the first direction, initial spatial offset from a first reference axis of the first direction, and initial spatial offset from a second reference axis of the second direction.

To enhance robustness, a major plurality of information bearing elements of the first type and a major plurality of information bearing elements of the second type are overlapping.

A minor plurality of information bearing elements of the first type and/or a minor plurality of information bearing elements of the second type are stand-alone or non-overlapping. The stand-alone information bearing elements provide information on the pattern defining elements or distribution rule and may be used to reconstruct a recessive information bearing pattern.

The composite information bearing elements of different shapes and/or dimensions are distributed within said information bearing device.

In some embodiments, a composite information bearing element of one type is surrounded by composite information bearing elements of another, different, type and vice versa.

FIGURES

The present disclosure will be described by way of example with reference to the accompanying Figures, in which:—

Figure 2A:
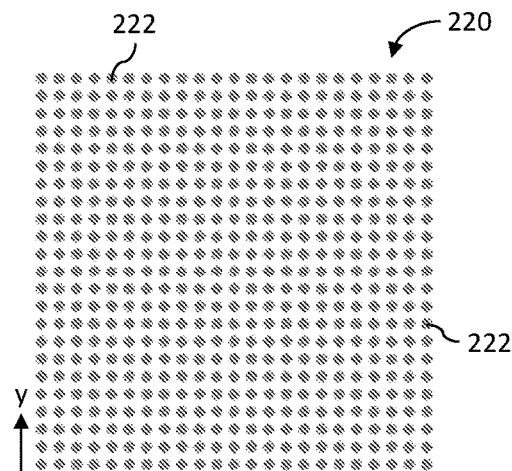
Figure 2B:
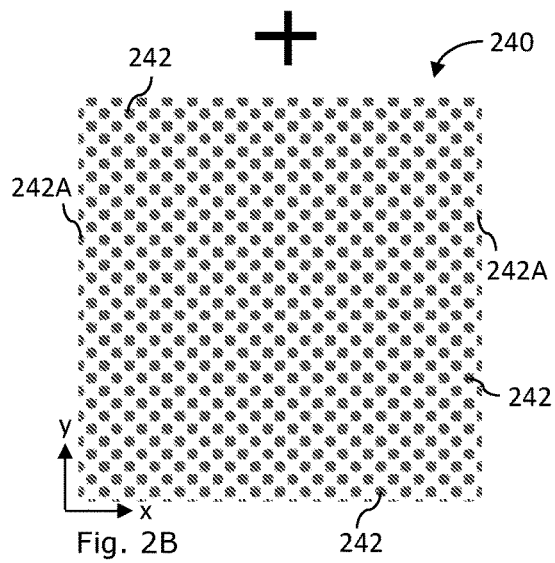
Figure 2:
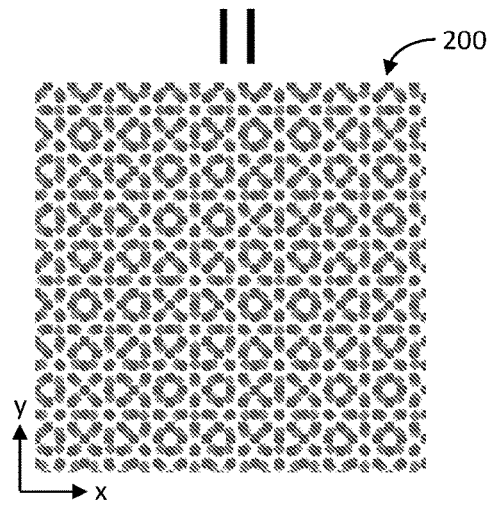
Figure 1E:
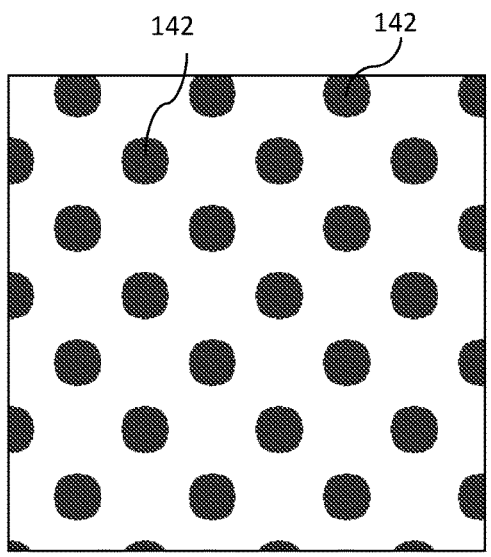
Figure 1G:
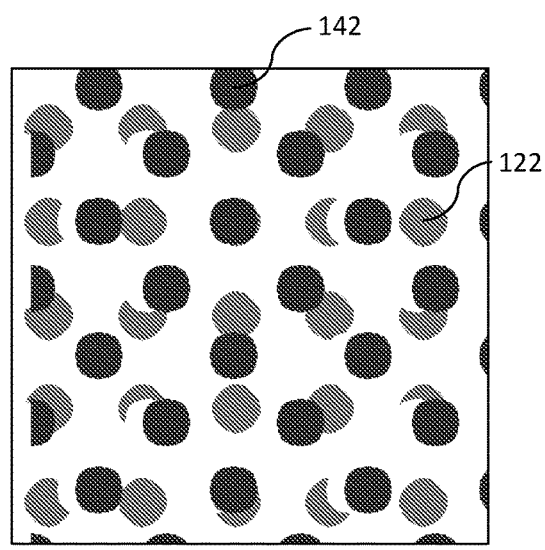
Figure 1F:
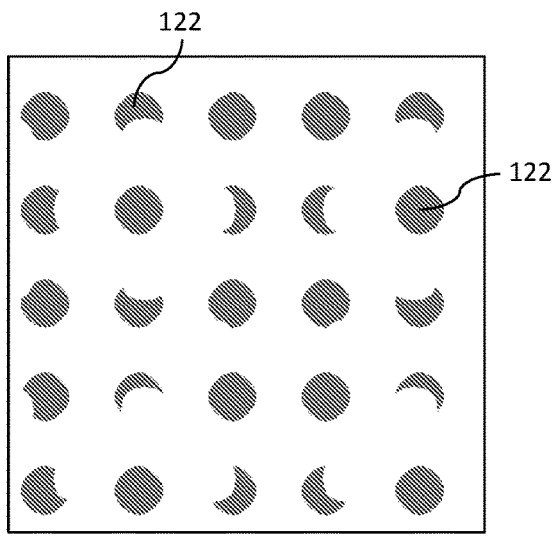
Figures 3A, 3B:
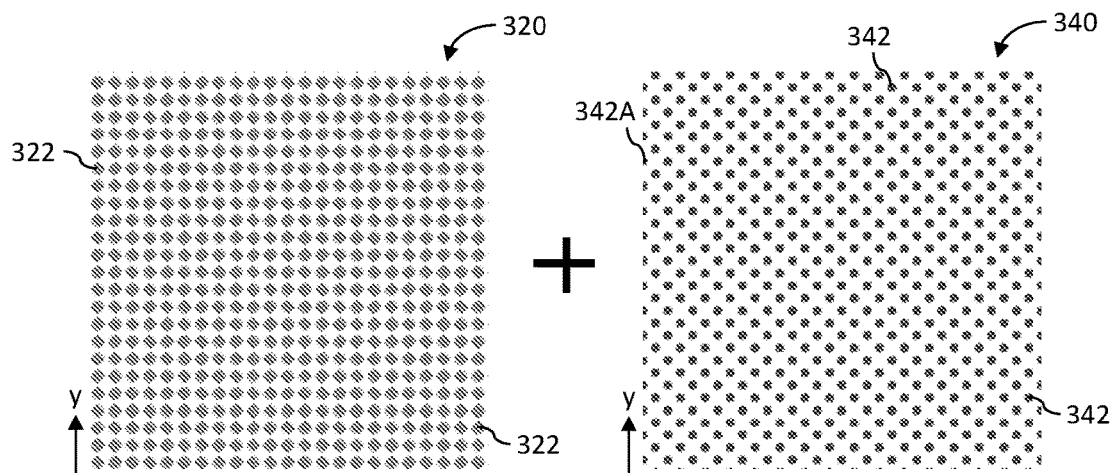
Figure 3:
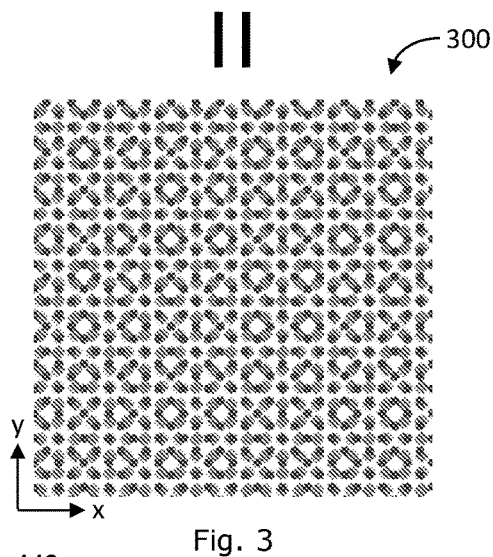
Figure 4:
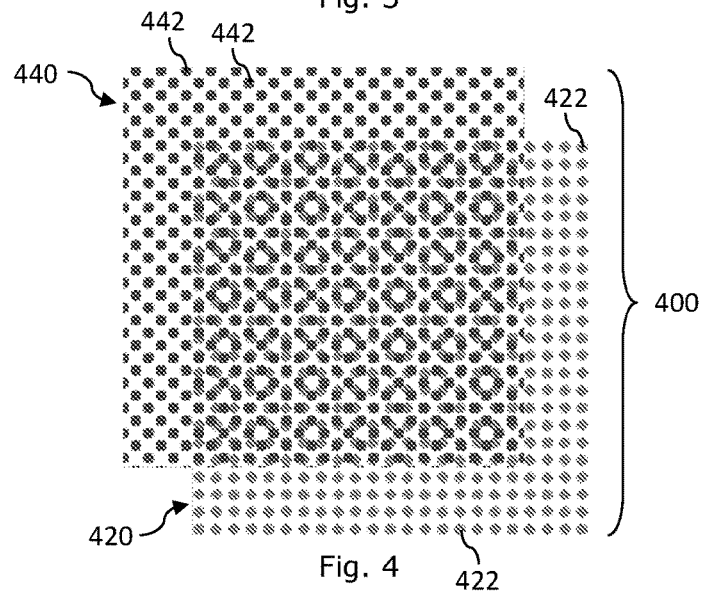
Figures 5A, 5B:
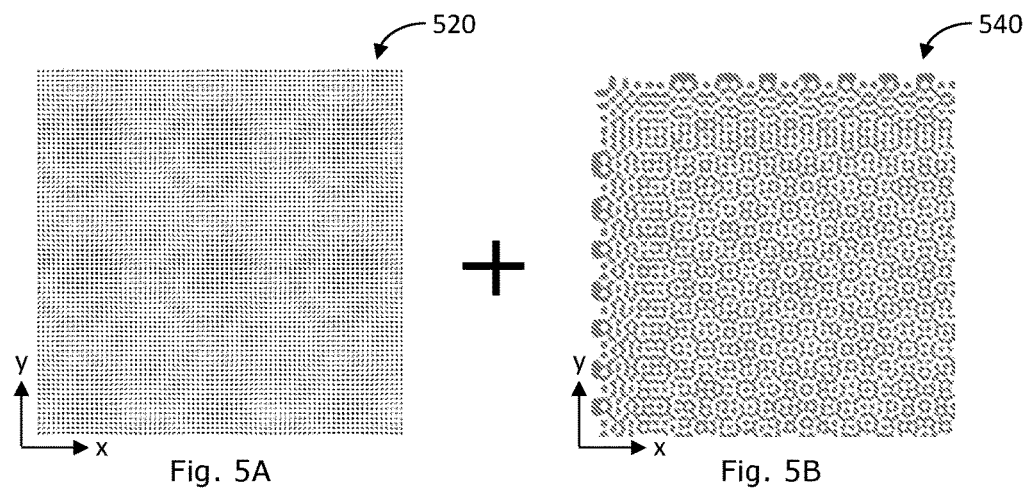
Figure 5:
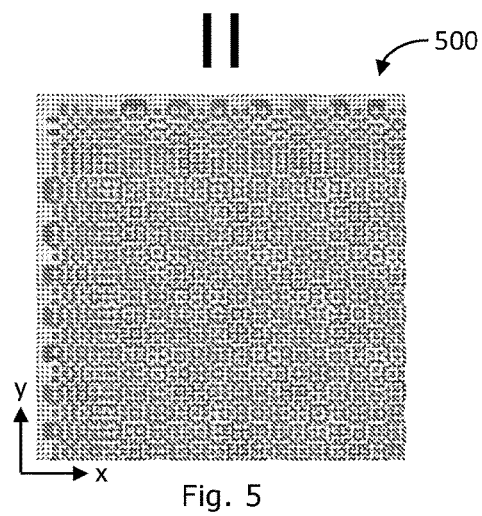
Figures 5C, 5D:
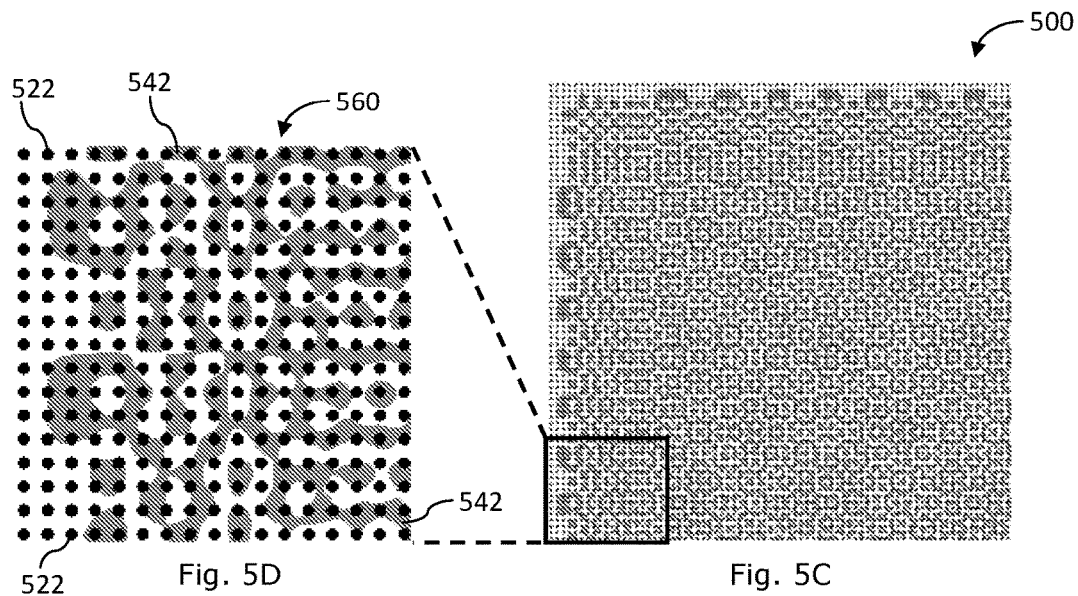
Figure 6:
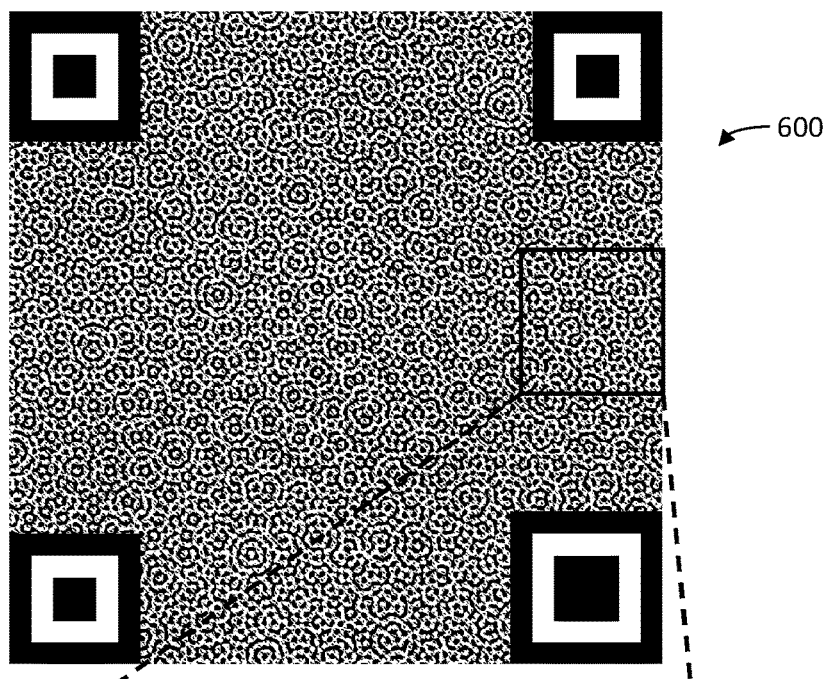
Figure 6X:
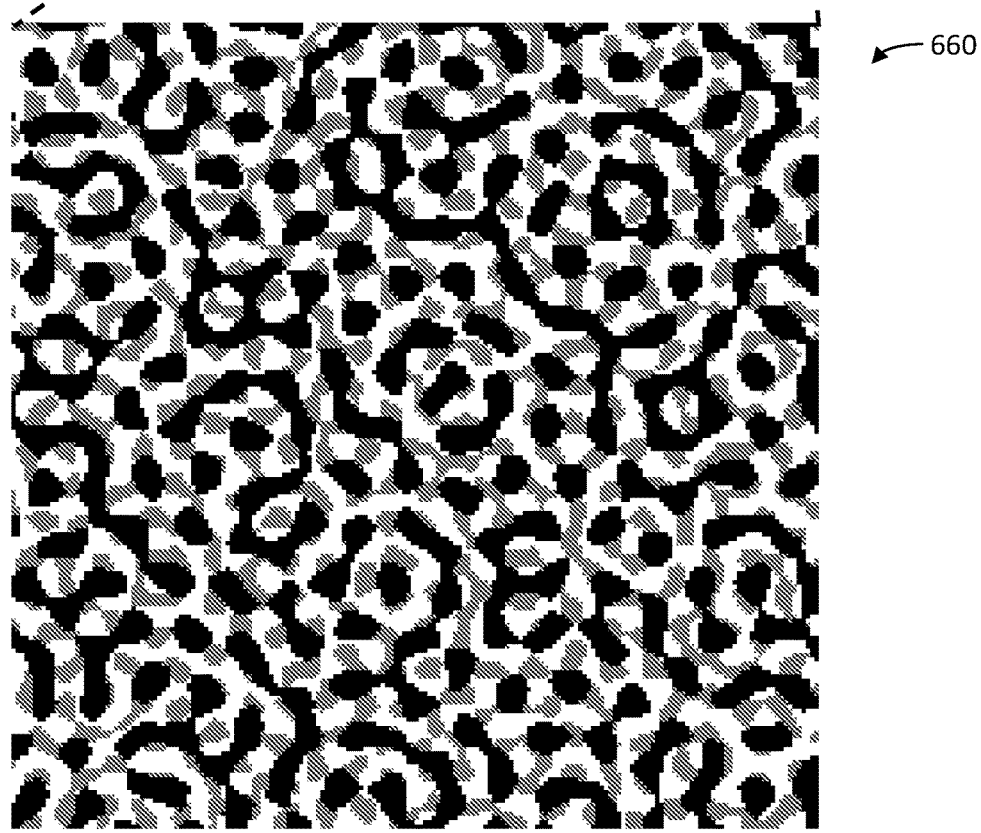
Figure 6A:
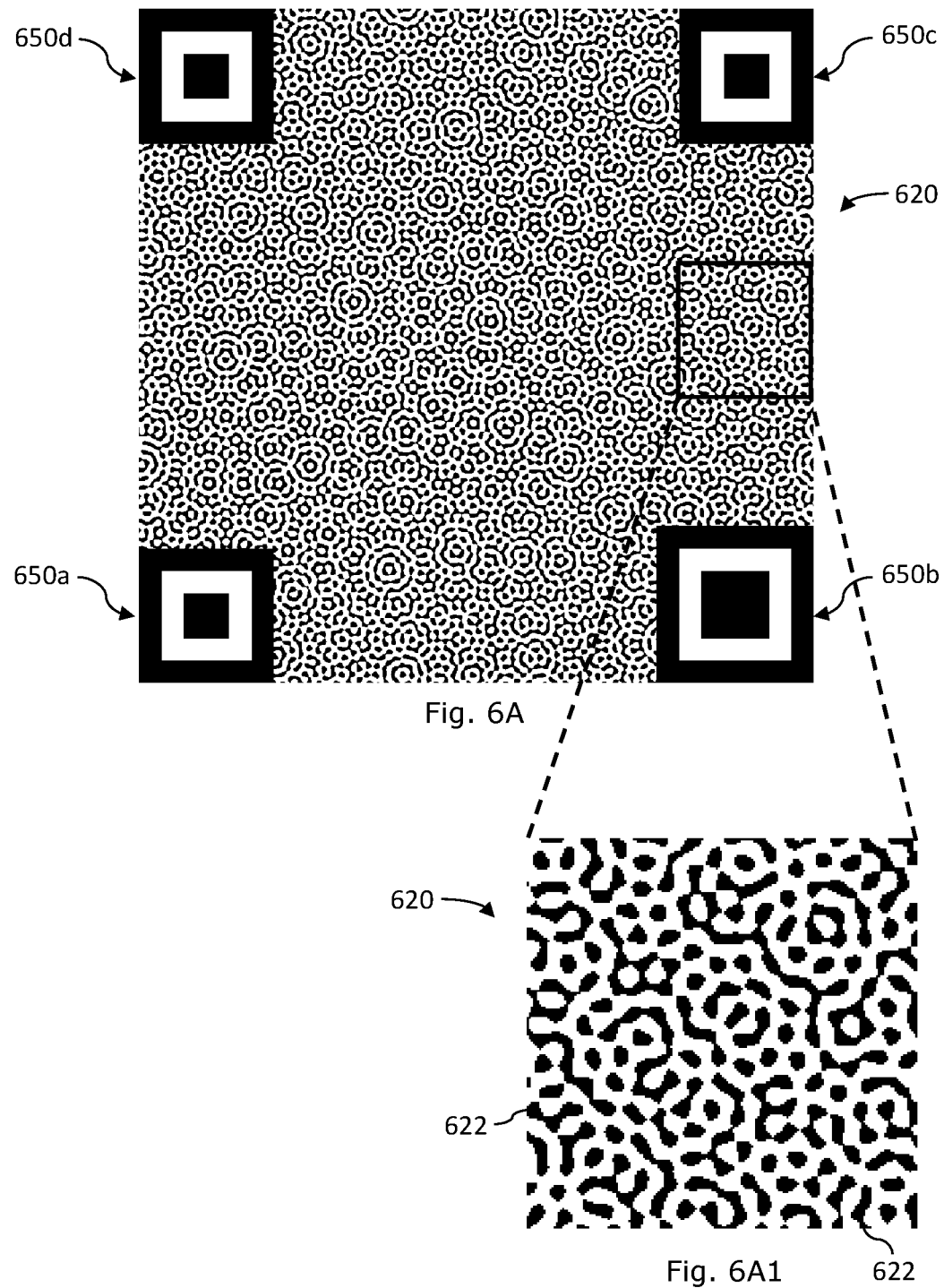

FIG. 1 depicts an example information bearing device according to the disclosure, FIG. 1A depicts a first pattern component to form the example information bearing device of FIG. 1, FIG. 1B depicts a second pattern component to form the example information bearing device of FIG. 1 when in combination of that of FIG. 1A, FIG. 1C is a marked-up of FIG. 1 depicted a delineated sample region, FIG. 1D is an enlarged view of the delineated sample region of FIG. 1C, FIG. 1E shows extraction of a colour dominant portion from the enlarged portion of FIG. 1D, FIG. 1F shows extraction of a colour submissive or colour recessive portion from the enlarged portion of FIG. 1D, FIG. 1G shows an example re-combination of the extracted colour dominant portion of FIG. 1E and the extracted colour dominant portion of FIG. 1F, FIG. 2 depicts another example information bearing device according to the disclosure, FIG. 2A depicts a first pattern component to form the example information bearing device of FIG. 2, FIG. 2B depicts a second pattern component to form the example information bearing device of FIG. 2 when in combination of that of FIG. 2A, FIG. 2C is a marked-up of FIG. 2 depicted a delineated sample region, FIG. 2D is an enlarged view of the delineated sample region of FIG. 2C, FIG. 3 depicts another example information bearing device according to the disclosure, FIG. 3A depicts a first pattern component to form the example information bearing device of FIG. 3, FIG. 3B depicts a second pattern component to form the example information bearing device of FIG. 3 when in combination of that of FIG. 3A, FIG. 4 depicts another example information bearing device according to the disclosure, FIG. 5 depicts another example information bearing device according to the disclosure, FIG. 5A depicts a first pattern component to form the example information bearing device of FIG. 5, FIG. 5B depicts a second pattern component to form the example information bearing device of FIG. 5 when in combination of that of FIG. 5A, FIG. 5C is a marked-up of FIG. 5 depicted a delineated sample region, FIG. 5D is an enlarged view of the delineated sample region of FIG. 5C, FIG. 6 depicts another example information bearing device according to the disclosure, FIG. 6X is an enlarged view of the delineated sample region of FIG. 6, FIG. 6A depicts a first pattern component to form the example information bearing device of FIG. 6, FIG. 6A1 is a portion of FIG. 6A corresponding to the delineated sample region of FIG. 6X, FIG. 6B depicts a second pattern component to form the example information bearing device of FIG. 6 when in combination of that of FIG. 6A, FIG. 6B1 is a portion of FIG. 6B corresponding to the delineated sample region of FIG. 6X, FIG. 7 depicts another example information bearing device according to the disclosure, FIG. 7X is an example signal diagram depicting a set of discrete data in the frequency or Fourier domain obtained by applying Fourier transform (FFT) on the example information bearing device of FIG. 7, FIG. 7A depicts a visually dominant second component pattern extracted from the example information bearing device of FIG. 7, FIG. 7A1 is an example signal diagram depicting a set of discrete data in the frequency or Fourier domain obtained by applying Fourier transform (FFT) on the visually dominant second component pattern of FIG. 7A, FIG. 7B depicts a visually submissive first component pattern extracted from the example information bearing device of FIG. 7, and FIG. 7B1 is an example signal diagram depicting a set of discrete data in the frequency or Fourier domain obtained by applying Fourier transform (FFT) on the visually submissive first component pattern of FIG. 7B.

DESCRIPTION

An example information bearing device 100 depicted in FIG. 1 comprises a first component pattern 120 of FIG. 1A and a second component pattern 140 of FIG. 1B in overlap.

An example pattern portion of the first component pattern 120 depicted in FIG. 1A comprises a plurality of example pattern defining elements. The example pattern defining elements are in the form of solid light blue dots which are distributed in a first pattern area. The example pattern defining elements are distributed according to a first distribution rule.

In this simplistic example, first pattern area of FIG. 1A can be arranged into an imaginary square matrix of 45 rows and 45 columns for distributing 45×45 pattern elements.

Each pattern defining element is in the form of a light blue dot 122. The light blue dot 122 has a rhombic shape, round corners and equal diagonal size. The diagonals of the rhombic dots are aligned with the direction of the rows and columns. All the light blue dots 122 have the same size, shape and dimensions and are not individually identifiable.

A recessive pattern defining element is visually recessive after printing (i.e. has a recessive visual property) when encountering dominant pattern defining elements that is visually dominant after printing (i.e. has a dominant visual property). Encountering here includes the meaning of overlapping, overprinting or merging. The dominance or the recessive-ness of pattern defining elements is often related to the printing method used. For example, for thermal-type printing, the dominance of pattern defining elements is related to the printing sequence of the patterns, for which the pattern defining elements of the second pattern printed on top will have more dominance over the pattern defining elements of the first pattern printed beneath. Using FIG. 1 as an example, the pattern defining elements in red are printed on top of the pattern defining elements in light blue and the red pattern defining elements would substantially cover the light blue pattern defining elements in the overlapping region, which gives a dominant visual property to the red pattern defining elements and a recessive visual property to the light blue pattern defining elements. The terms 'recessive' visual property and 'submissive' visual property are used interchangeably herein.

In the example first pattern area of FIG. 1A, there are 23×23 light blue dots 122 which are distributed into 23 rows and 23 columns. The light blue dots 122 are evenly distributed throughout the first pattern area such that the spacing or separation distance between adjacent light blue dots 122 in the same row or in the same column is the same.

The imaginary matrix comprises 45 rows and 45 columns. The matrix is imaginary to define a reference grid system to facilitate convenient description and is not actually present. In the description herein, the following conventions apply to the following symbols: [r=p] means row number is p, [c=q] means column number is q, and [r=p, c=q] means row number is p and column number is q.

The first column of the first pattern area has 23 light blue dots 122. The first light blue dot 122 is at row number 0 and column number 0, i.e., [r=0, c=0], of the imaginary matrix.

The light blue dots 122 on the same column have a uniform spacing. The next column of light blue dots 122 is separated from the first column of light blue dots 122 by a blank column and the light blue dots 122 on this column are on the same height (same row level) with their counterparts on the first column. Other columns of light blue dots 122 of the first component pattern 120 have the same distribution and separation relationship to their immediately adjacent columns, so that in this simplistic example the first component pattern 120 is a square matrix of 23×23 light blue dots of uniform spacing in the x- and y-directions.

In this specification, the x-direction is conveniently designated as the direction of a row and the y-direction is conveniently designated as the direction of a column. X- and y-axis will be correspondingly designated for convenient reference without loss of generality.

The example first pattern area of FIG. 1A is an image having an image size of M×N pixels distributed in an area A, where M=N=256 and when the binary level (light-blue or not light-blue) pattern is printed at 600 dots-per-inch (e.g. by a thermal-type printer), the area A is approximately 1.08 cm×1.08 cm. If the binary level pattern is printed at 2400 dots-per-inch (e.g. by an offset-type printer), the area A is approximately 0.27 cm×0.27 cm.

The light blue dots 122 are spatially distributed in the information bearing pattern according to the amplitude distribution rule below:

$$f_{blue}(x, y) = \mathrm{Re}\left\{\sum_{u=0}^{M-1}\sum_{v=0}^{N-1} F_{blue}(u, v) e^{i\left(\frac{2\pi}{N}ux + \frac{2\pi}{M}vy\right)}\right\} \quad (1)$$

The function $f_{blue}(x,y)$ is in the form of a Fourier transform function and the function $F_{blue}$ is a frequency domain function representing frequency domain properties given by the following expression:

$$F_{blue}(u, v) = a_1(u, v) + a_2(u, v) \quad (2)$$

Where, $a_1(u, v) = \begin{cases} 1, & \text{for } (u = \mu_1, v = v_1) \\ 0, & \text{otherwise} \end{cases}$, and (3)

$$a_2(u, v) = \begin{cases} 1, & \text{for } (u = \mu_2, v = v_2) \\ 0, & \text{otherwise} \end{cases}$$

For the example of FIG. 1A, there are two frequency domain points, namely, $P_1$ ($\mu_1=23$, $v_1=0$) and $P_2$ ($\mu_2=0$, $v_2=23$). In the expression (2), the variables $\mu_1$ and $\mu_2$ correspond to repetition frequency of the light blue dots in the x-direction and the variables $v_1$ and $v_2$ correspond to repetition frequency of the light blue dots in the y-direction.

As an example, the information bearing pattern 120 can be used to represent any of the following discrete data: $\mu_1$, $v_1$, $\mu_2$, $v_2$. These discrete data may represent a coded message and thus the information bearing pattern 120 may bear a coded message.

So that each pattern defining element 122 is a solid dot having a uniform colour intensity, a quantization scheme is adopted to process the expression (1) such that:

$$f_{blue,\,quantized}(x, y) = \begin{cases} 1 & \text{for } f_{blue}(x, y) > S_{blue} \\ 0 & \text{for } f_{blue}(x, y) \leq S_{blue} \end{cases} \quad (4)$$

By applying a quantization scheme, such as that of expression (4), the first component pattern 120 will have two types of signals on it, namely, i) pattern defining dots 122 of a uniform colour intensity, and ii) a plain background.

Intuitively, the first frequency domain data points $P_1$ and $P_2$ can be manifested as a total of 23×23 pattern defining dots in the first pattern area.

The amplitude distribution rule of (1) has an oscillatory or sinusoidal property. By changing the quantization threshold, or the threshold level, $S_{blue}$, the size of the pattern defining dots can be varied. For example, the dot size would decrease and become thinner by moving the threshold value higher, and the dot size would increase and become thicker by moving the threshold value lower.

In this example, each rhombic light blue dot 122 has a width (i.e., diagonal width) of 0.28 mm and a height (i.e., diagonal height) also of 0.28 mm. The separation distance between centres of adjacent light blue dots 122 in the same row or same column is the same and equals 0.048 cm. These spatial values assume a printing resolution of 600 dots-per-inch. The size of the light blue dots 122 is determined by the quantization threshold and is variable by selecting and changing the quantization thresholds.

In the example of FIG. 1A, the net frequency $\omega = \sqrt{\mu_1^2 + v_1^2} = \sqrt{\mu_2^2 + v_2^2} = 23$. When the first pattern area of FIG. 1A is printed with a printing resolution of 600 dots-per-inch, e.g. by a thermal-type printer, the printed pattern has a resolution of $$\frac{23}{256} * 600 = 54$$

lines-per-inch ("LPI"). In order to illustrate the pattern of FIG. 1A clearly for pedagogical purpose, the pattern defining elements are only distributed at 54 lines-per-inch at printing resolution 600 dots-per-inch; however, in practice, pattern defining elements distributed at lines-per-inch higher than 150 can be achieved at printing resolution 600 dots-per-inch by adjusting the $\mu_1$, $v_1$, $\mu_2$, $v_2$, M, N parameters. When the first pattern area of FIG. 1A is printed with a printing resolution of 2400 dots-per-inch, e.g. by an offset-type printer, the printed pattern has a resolution of $$\frac{23}{256} * 2400 = 216$$

lines-per-inch ("LPI").

The first pattern area of FIG. 1A and therefore the position of the light blue dots 122 can be shifted in the x-direction by an offset amount $\varepsilon_x$ and in the y-direction for an offset amount $\varepsilon_y$ as follows:

$$f_{blue}(x, y) = \text{Re}\left\{\sum_{u=0}^{M-1}\sum_{v=0}^{N-1} F_{blue}(u, v)\text{Exp}\left(i\frac{2\pi}{N}u(x+\varepsilon_x) + i\frac{2\pi}{M}v(y+\varepsilon_y)\right)\right\}$$

An example pattern portion of the second component pattern 140 depicted in FIG. 1B comprises a plurality of example pattern defining elements. The example pattern defining elements are in the form of red dots 142 which are distributed in a second pattern area. The example pattern defining elements are distributed according to a second distribution rule.

In this simplistic example, the second pattern area of FIG. 1B can be arranged into an imaginary square matrix of 33 rows and 33 columns for distributing 33×33 pattern defining elements. Likewise, this matrix is an imaginary matrix to devise an imaginary reference grid to facilitate convenient description.

Each pattern defining element is in the form of a solid red dot 142. The red dot 142 has a square shape and round corners. The sides of the square red dots 142 are aligned with the direction of the rows and columns. All the red dots 142 have the same size, shape and dimensions and are not individually identifiable.

FIG. 1 illustrates the case of having dominant pattern defining elements by printing them on top of recessive pattern defining elements, which is often the case, for instance, for thermal-type printing. As depicted in FIG. 1, the second component pattern 140 comprises dominant pattern defining elements, this is because these dominant pattern defining elements are printed on top of the recessive pattern defining elements of the first component pattern 120. This gives a dominant visual property to the dominant pattern defining elements and a recessive visual property to the recessive pattern defining elements.

In the example second pattern area of FIG. 1B, there are 16×16 red dots 142 which are distributed in a square matrix of 33 rows and 33 columns. The red dots 142 are evenly distributed throughout the second pattern area such that the spacing or separation distance between adjacent red dots 142 in the same row or in the same column is the same.

The first column of the second pattern area has 16 half red dots 142A. Each of the half red dots 142A is a vertically truncated half portion of a red dot 142. The first red dot 142 on the first column is at row number 1 and column number 0, i.e., [r=1, c=0], of the imaginary matrix. The red dots 142 on the same column have a uniform spacing. The next column of red dots 142 next to the first column is at column number 1 [c=1] and the first red dot 142 on this column is a minor portion of a red dot 142 beginning at row number 0. Other red dots 142 on this column are at a uniform spacing and the last red dot 142 on this column is a major portion of a red dot 142 at row number 32. The next column of red dots 142 is in column number 2. The red dots 142 in this column has the same distribution properties as that of column 1, except that the first red dot 142 on this column is a complete red dot 142 at row number 1 and the last red dot on this column is a complete red dot 142 at row number 31, the penultimate row. There are 16 complete red dots 142 in column number 2. The other columns on this second pattern area are a repetition of columns 1 and 2 in their same relative sequence except the last column. The last column [c=32] comprises 16 vertically truncated red dots. The second component pattern 140 has red dots of uniform spacing in the x- and y-directions. Likewise, the x-direction is in the direction of row and the y-direction is in the direction of columns.

The example second pattern area of FIG. 1B is an image having an image size of M×N pixels distributed in an area A, where M=N=256 and when the binary level (light-blue or not light-blue) pattern is printed at 600 dots-per-inch (e.g. by a thermal-type printer), the area A is approximately 1.08 cm×1.08 cm. If the binary level pattern is printed at 2400 dots-per-inch (e.g. by an offset-type printer), the area A is approximately 0.27 cm×0.27 cm. The image parameters are selected to be the same as those of the first component pattern 120 so that they can be overlapped with edges in alignment.

The red dots 142 are spatially distributed in the information bearing pattern according to the amplitude distribution rule below:

$$f_{red}(x, y) = \text{Re}\left\{\sum_{u=0}^{M-1}\sum_{v=0}^{N-1} F_{red}(u, v)e^{i\left(\frac{2\pi}{N}ux + \frac{2\pi}{M}vy\right)}\right\} \quad (5)$$

The function $f_{red}(x,y)$ is in the form of a Fourier transform function and the function $F_{red}$ is a frequency domain function representing frequency domain properties given by the following expression:

$$F_{red}(u, v) = a_3(u, v) + a_4(u, v) \quad (6)$$

$$\text{Where, } a_3(u, v) = \begin{cases} 1, & \text{for } (u = \mu_3, v = v_3) \\ 0, & \text{otherwise} \end{cases}, \text{ and} \quad (7)$$

$$a_4(u, v) = \begin{cases} 1, & \text{for } (u = \mu_4, v = v_4) \\ 0, & \text{otherwise} \end{cases}$$

For the example of FIG. 1B, there are two frequency domain points, namely, $P_3$ ($\mu_3=16$, $v_3=16$) and $P_4$ ($\mu_4=-16$, $v_4=16$). In expression (6), the variables $\mu_3$ and $\mu_4$ correspond to repetition frequency of the red dots 142 in the x-direction and the variables $v_3$ and $v_4$ correspond to repetition frequency of the red dots 142 in the y-direction.

So that each pattern defining element 142 is a solid red dot having a uniform colour intensity, a quantization scheme is adopted to process the expression (1) such that:

$$f_{red, quantized}(x, y) = \begin{cases} 1 & \text{for } f_{red}(x, y) > S_{red} \\ 0 & \text{for } f_{red}(x, y) \leq S_{red} \end{cases} \quad (8)$$

By applying a quantization scheme, such as that of expression (8), the first component pattern 140 will have two types of signals on it, namely, i) pattern defining dots 142 of a uniform colour intensity, and ii) a plain (or colourless) background.

Intuitively, the frequency domain data points $P_3$ and $P_4$ can be manifested as red dots 142 repeating 16 times at uniform spacing in both the x- and y-directions in the second pattern area. The resultant repetition frequency ($\omega$) of the red dots 142 (along the diagonals of the second pattern area) due to the frequency domain data points $P_3$, $P_4$ would be $\omega = \sqrt{16^2+16^2} = 23$.

The amplitude distribution rule of (5) has an oscillatory or sinusoidal property. By changing the quantization threshold, or the threshold level, $S_{red}$, the size of the pattern defining dots can be varied. Likewise, the dot size would decrease and become thinner by moving the threshold value higher, and the dot size would increase and become thicker by moving the threshold value lower.

In this example, each rounded square red dots 142 has a width (i.e., side width) of 0.28 mm and a height (i.e., side height) also of 0.28 mm. The separation distance between adjacent red dots 142 in the same row or same column is the same and equals 0.64 mm. These spatial values assume printing resolution of 600 dots-per-inch. The size of the red dots 142 is determined by the quantization threshold and is variable by selecting and changing the quantization thresholds.

In the example of FIG. 1B, the net frequency $\omega = \sqrt{\mu_3^2+v_3^2} = \sqrt{\mu_4^2+v_4^2} = 23$. When the second pattern area of FIG. 1B is printed with a printing resolution of 600 dots-per-inch, e.g. by a thermal-type printer, the printed pattern has a resolution of $$\frac{23}{256} * 600 = 54$$

lines-per-inch ("LPI"). In order to illustrate the pattern of FIG. 1B clearly for pedagogical purpose, the pattern defining elements are only distributed at 54 lines-per-inch at printing resolution 600 dots-per-inch; however, in practice, pattern defining elements distributed at lines-per-inch higher than 150 can be achieved at printing resolution 600 dots-per-inch by adjusting the $\mu_3$, $v_3$, $\mu_4$, $v_4$, M, N parameters. When the second pattern area of FIG. 1B is printed with a printing resolution of 2400 dots-per-inch, e.g. by an offset-type printer, the printed pattern has a resolution of $$\frac{23}{256} * 2400 = 216$$

lines-per-inch ("LPI").

Likewise, the second pattern area of FIG. 1B and therefore the position of the red dots 142 can be shifted in the x-direction by an offset amount $\varepsilon_x$, and in the y-direction for an offset amount, $\varepsilon_y$, without loss of generality.

As an example, the information bearing pattern 140 can be used to represent any of the following discrete data: $\mu_3$, $v_3$, $\mu_4$, $v_4$, $\varepsilon_x$, $\varepsilon_y$, or their combination. These discrete data may represent a coded message and thus the information bearing pattern 140 may bear a coded message.

The example information bearing device 100 of FIG. 1 is formed by combining the first component pattern 120 of FIG. 1A and the second component pattern 140 of FIG. 1B. More specifically, the example information bearing device 100 is formed by overlapping of the first component pattern 120 and the second component pattern 140 with the first and second pattern areas in alignment such that the origin and the respective x- and y-axes are in alignment. Overlapping of the first component pattern 120 and the second component pattern 140 forms an overlapping data bearing region. The overlapping data bearing pattern comprises pattern defining dots 122 of the first component pattern 120 and pattern defining dots 142 of the second component pattern 140.

The overlapping data bearing region of FIG. 1 comprises three types of pattern defining elements, namely, a first type being the light blue dots 122, a second type being the red dots 142, and a third type being a hybrid of the first and the second types. The hybrid pattern defining elements are formed by partial merging of the first and second types, that is, partial merging of the light blue and red dots.

The hybrid pattern defining elements have irregular shapes and dimensions, as depicted in FIG. 1C and an enlarged portion 160 of an overlapping pattern portion of FIG. 1D, even though their respective components have uniform shapes and uniform dimensions. While the hybrid pattern defining elements are formed by partial merging of the first and the second types of pattern defining dots 122, 142, the relative orientations of the component pattern defining elements are not uniform and are variable.

A hybrid pattern defining element comprises at least three portions, namely, a first portion due to the first type of pattern defining element, a second portion due to the second type of pattern defining element, and a third portion due to overlapping of pattern defining elements of both the first and the second types.

In general, the first type of pattern defining element would be in a first colour and the second type of pattern defining element would be in a second colour different to the first colour. One of the first or second colours is the colour of the dominant pattern defining element while the other one is the colour of the recessive pattern defining element.

In the example of FIG. 1, pattern defining elements of the first type are solid dots in light blue and pattern defining elements of the second type are solid dots in red. As a result of printing red pattern defining elements over light blue pattern defining elements, contribution to the overlapping portions of the hybrid pattern defining elements by the light blue dots is barely or not visible. In other words, the light blue dots in the overlapping portions of the hybrid pattern defining elements are buried such that the presence of light blue in the third or overlapping portions of the hybrid pattern defining elements is not identifiable by or visible to the naked eye. On the other hand, the entirety of the pattern ("dominant pattern") formed by the pattern defining elements of a dominant visual property remains intact, unburied, and/or uncovered. Therefore, the dominant pattern is more easily extractable.

By having an information bearing device comprising hybrid pattern defining elements which are formed by partial merging of a pattern defining element having a dominant visual property and another pattern defining element having a recessive or submissive visual property, the risk of tampering such as unauthorised reproduction or counterfeiting will be usefully mitigated.

As an example case of unfaithfully reconstructing the information bearing device 100, counterfeit process would successfully extract and regenerate the dominant pattern and the dominant pattern defining elements, as depicted in FIG. 1E.

However, the counterfeit process would only be able to extract and regenerate the unburied portion of the submissive component pattern and the unburied pattern defining elements, as depicted in FIG. 1F. The buried or covered portion the submissive component pattern is not recovered, however.

When the extracted patterns of FIGS. 1E and 1F are recombined to imitate or counterfeit the original information bearing device 100, a slight misalignment in reproduction would result in a detectable misalignment, such as those depicted in FIG. 1G.

As the dominant pattern defining element and the submissive pattern defining elements are partially merged to form a hybrid pattern defining element, the dominant and submissive pattern defining elements are joined in a seamless manner with seamless abutment. A misalignment gap between a dominant pattern defining element and a submissive pattern defining element that cooperate to form a hybrid pattern defining element is indicative of tampering, if not counterfeiting or unauthorised reproductions.

So that there is sufficient diversity in orientations between the first and the second types of pattern defining elements, the first and second component patterns are devised such that a pattern defining element of the first type is surrounded by a plurality of pattern defining elements of the second type and vice versa. By having a plurality of pattern defining elements of one type surrounding a plurality of pattern defining elements of another type, orientation diversity of the hybrid pattern defining elements will follow.

In the example of FIG. 1, diversity in orientations will be obtained by setting the ($\mu$, $\nu$) parameters so that the ($\mu$, $\nu$) parameters of the first and second pattern in the same orientation are not the same.

An example information bearing device 200 depicted in FIG. 2 comprises a first component pattern 220 of FIG. 2A and a second component pattern 240 of FIG. 2B in overlap. This example is to illustrate another possibility of having dominant and recessive pattern defining elements, in which the recessive-ness of pattern defining elements is related to the lightness of the colour, and in other words, the dominance of pattern defining elements is related to the darkness of the colour, which is often the case for offset-type printing. Moreover in this example, the dominant and recessive visual properties are not necessarily related to the printing sequence of the component patterns. Here, the light blue dots of the first component pattern 220 is more recessive or has a recessive colour relative to the dark blue dots of the second component pattern 240, which is more dominant or has a dominant colour. The pattern defining elements of the first component pattern 220 and the pattern defining elements of the second component pattern 240 are of colours that are within a blue-scale, or more generally, a grayscale. As an example, the dominant dark blue has a lower grayscale level and the recessive light blue has a higher grayscale level.

The first component pattern 220 is identical to that of the first component pattern 120 except that the dot size of the pattern defining elements, namely, the light blue dots 222, is larger or fatter and at approximately 0.09 mm (assuming printing resolution of 2400 dots-per-inch). The description on and relating to the first component pattern 120 is incorporated herein and applies mutatis mutandis to first component pattern 220 where the context permits, with numerals added by 100. The fatter pattern defining elements are obtained by setting a lower amplitude threshold. Under a same printing resolution, with fatter dots, the separation distance between centres of adjacent light blue dots 222 are the same as those of light blue dots 122, but there is a reduced clearance between adjacent light blue dots 222 compared to those of light blue dots 122, thereby increasing possibility of overlapping with counterpart pattern defining elements 242.

The second component pattern 240 is identical to that of the second component pattern 140 except that the pattern defining elements are dark blue dots 242 which are in colour dark blue instead of red and the size of each dot 242 is approximately 0.08 mm (assuming printing resolution of 2400 dots-per-inch). The description on and relating to the second component pattern 140 is incorporated herein and applies mutatis mutandis to second component pattern 240 where the context permits, with numerals added by 100.

In this example, the first component pattern 220 is formed by spatial distribution of the more colour recessive light blue dots 222 and the second component pattern 240 is formed by spatial distribution of the more colour dominant dark blue dots 242.

The example information bearing device 200 of FIG. 2 is formed by combining the first component pattern 220 of FIG. 2A and the second component pattern 240 of FIG. 2B in edge and origin alignment. The description on and relating to the information bearing device 100, especially the description on the overlapping data bearing pattern and the overlapping data bearing region, is incorporated herein and applies mutatis mutandis to information bearing device 200 where the context permits, with numerals added by 100. Example hybrid pattern defining elements of the example information bearing device 200 are shown in an overlapping pattern portion 260 of FIG. 2D which is a portion selected from an example window marked in FIG. 2C.

As an example case of unfaithfully reconstructing the information bearing device 200, the counterfeit process may involve extracting the both patterns as one pattern of a single colour to imitate the original. However, as the two patterns of information bearing device 200 have different colours, the resultant counterfeited pattern would differ to the original genuine device. As the two patterns would be merged into one pattern, the discrete set of frequency data would be erroneously altered.

An example information bearing device 300 depicted in FIG. 3 comprises a first component pattern 320 of FIG. 3A and a second component pattern 340 of FIG. 3B in overlap.

The first component pattern 320 is identical to that of the first component pattern 220 and the description on and relating to the first component pattern 220 is incorporated herein and applies mutatis mutandis to first component pattern 320 where the context permits, with numerals added by 100.

The second component pattern 340 is identical to that of the second component pattern 140 and the description on and relating to the second component pattern 140 is incorporated herein and applies mutatis mutandis to first component pattern 340 where the context permits, with numerals added by 200.

The example information bearing device 300 of FIG. 3 is formed by combining the first component pattern 320 of FIG. 3A and the second component pattern 340 of FIG. 3B when in edge and origin alignment. The description on and relating to the information bearing device 100, especially the description on the overlapping data bearing pattern and the overlapping data bearing region, is incorporated herein and applies mutatis mutandis to information bearing device 300 where the context permits, with numerals added by 200.

The example information bearing devices 100, 200, 300 are formed by combining respectively the first component pattern 120, 220, 320 and the second component pattern 140, 240, 340 when in edge and origin alignment.

However, the combination may be by partial overlapping of a first component pattern 420 and a second component pattern 440, as depicted in the example information bearing devices 400 of FIG. 4. In the information bearing devices 400, the first component pattern 420 are formed from recessive pattern defining elements of colour light blue and the second component pattern 440 are formed from dominant pattern defining elements of colour red. The first component pattern 420 and second component pattern 440 are in partial overlap to form an overlapping data bearing pattern in an overlapping data bearing region.

The first component pattern 420 may be one of first component patterns 120, 140, 220, 240, 320, 340, or other appropriate data bearing pattern without loss of generality. The second component pattern 440 may be one of first component patterns 120, 140, 220, 240, 320, 340, or other data bearing pattern without loss of generality as long as the colours of the component patterns are different. The description on component patterns 120, 220, 320, 140, 240, 340 is incorporated herein by reference. The description on and relating to the information bearing device 100, especially the description on the overlapping data bearing pattern and the overlapping data bearing region, is incorporated herein and applies mutatis mutandis to information bearing device 400 where the context permits, with numerals added by 300.

To further enhance robustness against tampering or unauthorised reproduction, density of the pattern defining elements of the first and/or second component pattern may be set to 150 LPI×150 LPI=22500 elements per inch$^2$ or higher.

An example information bearing device 500 depicted in FIG. 5 comprises a first component pattern 520 of FIG. 5A and a second component pattern 540 of FIG. 5B.

The first component pattern 520 is of a form which is the same as the first component patterns 120, 220, 320, but with the pattern defining elements in black and the following general expressions and distinguishing parameters:

$$f_{520}(x, y) = \text{Re}\left\{\sum_{u=0}^{M-1}\sum_{v=0}^{N-1} F_{520}(u, v)e^{i\left(\frac{2\pi}{N}ux+\frac{2\pi}{M}vy\right)}\right\}$$

$$F_{520}(u, v) = P_5(u, v) + P_6(u, v), \text{ where,}$$

$$P_5(u, v) = \begin{cases} 1, & \text{for } (u = \mu_5, v = v_5) \\ 0, & \text{otherwise} \end{cases}, \text{ and}$$

$$P_6(u, v) = \begin{cases} 1, & \text{for } (u = \mu_6, v = v_6) \\ 0, & \text{otherwise} \end{cases}.$$

The expression "Re" herein means "the real part of" and the set of discrete data in frequency domain is as follows:

| $P_i$ | $P_5$ | $P_6$ |
|---|---|---|
| $(\mu_i, v_i)$ | $(\mu_5, v_5)$ | $(\mu_6, v_6)$ |
|  | (76, 0) | (0, 76) |

These discrete data may represent a coded message and thus the information bearing pattern 520 may bear a coded message. The first component pattern 520 is an image pattern formed by a total of 1024×1024 pixels; the size is 1.08 cm×1.08 cm when printed at 2400 dots-per-inch, with the pattern defining elements in colour black.

The frequency domain data $P_i$ also determines the repetition frequency of the pattern defining elements, that is, the black dots, which is $\omega=\sqrt{76^2+0^2}=76$ lines in the image pattern. When the first component pattern 520 of information bearing device 500 is printed with a printing resolution of 2400 dots-per-inch, the printed pattern has $$\frac{76}{1024} * 2400 = 178$$

lines-per-inch.

The size of each black dot is approximately 0.07 mm and the distance between adjacent black dots is 0.13 mm with the application of a similar quantization scheme below:

$$f_{520, quantized}(x, y) =$$

$$\begin{cases} 1 & \text{for } f_{black}(x, y) > S_{black} \\ 0 & \text{for } f_{black}(x, y) \leq S_{black} \end{cases}, \text{ where } f_{black}(x, y) = f_{520}(x, y).$$

The second component pattern 540 is a data bearing pattern having pattern defining elements distributed according to the exemplary distribution relationship below:

$$f_{540}(x,y)=\beta_k(x,y;\mu_1,v_1)+\beta_k(x,y;\mu_2,v_2)+\beta_k(x,y;\mu_3,v_3) \qquad (9)$$

The terms in expression (9) have the following meaning:

$$\beta_k(x, y; u, v) = G_k(x, y; u, v)J_k\left(\frac{\alpha_{k,u}\alpha_{k,x}}{\alpha_{k,M+1}}\right)J_k\left(\frac{\alpha_{k,v}\alpha_{k,y}}{\alpha_{k,N+1}}\right) \qquad (10)$$

$$J_k(r) = \sum_{i=0}^{\infty} \frac{(-1)^i}{i!\Gamma(i+k+1)}\left(\frac{r}{2}\right)^{2i+k}$$

Where, $J_k(r)$ is a Bessel function of the first kind, $\alpha_{k,i}$ is the i-th root of Bessel function of the first kind of order k and Γ is a gamma function, $G_k(x,y; u,v)$ is a normalisation factor, and $$G_k(x, y; u, v) = \frac{4}{|J_{k+1}(\alpha_{k,u})||J_{k+1}(\alpha_{k,x})||J_{k+1}(\alpha_{k,v})||J_{k+1}(\alpha_{k,y})|}.$$

In the example of FIG. 5B, each Bessel component $\beta_k(x,y; u,v)$ comprises a set of discrete data variables $(\mu_i, v_i)$. These discrete data may represent a coded message and thus the information bearing pattern 540 may bear a coded message.

In the example second component pattern 540, there are three Bessel components $\beta_k(x,y; u,v)$ comprise 3 sets of discrete data variables $(u_i, v_i)$ as follows.

| $B_i$ | $B_1$ | $B_2$ | $B_3$ |
|---|---|---|---|
| $(\mu_i, v_i)$ | $(\mu_1, v_1)$ | $(\mu_2, v_2)$ | $(\mu_3, v_3)$ |
|  | (86, 14) | (61, 61) | (14, 86) |

In the Bessel domain, the Bessel domain function is given by:

$$F_{bessel}(u, v) = B_1(u, v) + B_2(u, v) + B_3(u, v), \text{ where}$$

$$B_1(u, v) = \begin{cases} 1, & \text{for } (u = \mu_1, v = v_1) \\ 0, & \text{otherwise} \end{cases},$$

$$B_2(u, v) = \begin{cases} 1, & \text{for } (u = \mu_2, v = v_2) \\ 0, & \text{otherwise} \end{cases}, \text{ and}$$

$$B_3(u, v) = \begin{cases} 1, & \text{for } (u = \mu_3, v = v_3) \\ 0, & \text{otherwise} \end{cases}.$$

Selecting the Bessel order constant (k) as 10, the second component pattern 540 can be represented by the following expression:

$$f_{bessel}(x,y) = \beta_{k=10}(x,y; u=86, v=14) + \beta_{k=10}(x,y; u=61, v=61) + \beta_{k=10}(x,y; u=14, v=86)$$

where $f_{bessel}(x,y) = f_{540}(x,y)$.

The amplitude of a Bessel component $\beta_k(x,y; u,v)$ is oscillatory. In order that the pattern defining element 542 is solid and has uniform colour intensity, a quantization scheme is adopted to process the expression (9). An example quantization scheme is to select a threshold amplitude level $S_{bessel}$ such that:

$f_{bessel}(x,y) > S_{bessel}$: Pattern defining element present;

$f_{bessel}(x,y) \leq S_{bessel}$: Pattern defining element absent.

Hence the second component pattern 540 is mathematically given by:

$$f_{bessel, quantized}(x, y) = \begin{cases} 1 & \text{for } f_{bessel}(x, y) > S_{bessel} \\ 0 & \text{for } f_{bessel}(x, y) \leq S_{bessel} \end{cases}$$

The second component pattern 540 is an image pattern formed by a total of 1024×1024 pixels in a size of 1.08 cm×1.08 cm when printed at 2400 dots-per-inch and in colour light blue.

The example information bearing device 500 of FIG. 5 is formed by combining the first component pattern 520 of FIG. 5A and the second component pattern 540 of FIG. 5B in edge and origin alignment. The description on and relating to the information bearing device 100, especially the description on the overlapping data bearing pattern and the overlapping data bearing region, is incorporated herein and applies mutatis mutandis to information bearing device 500 where the context permits, with numerals added by 400.

As depicted in FIG. 5C and an enlarged portion 560 of an overlapping pattern portion in FIG. 5D, the recessive pattern defining elements 542 of the second component pattern 540 are in curly shapes and define loops, curls and dots of different and irregular shapes and dimensions with diversity in orientation. The dominant pattern defining elements 522 of the first component pattern 520 are formed as solid black dots of a uniform size. The recessive pattern defining elements 542 of the second component pattern 540 are etched by dominant pattern defining elements 522 of the second component pattern 520.

In another example, the example information bearing device has the same arrangement and description as that of the example information bearing device 500, but with the colours of the first and second component patterns exchanged such that the first component pattern 520 is in a recessive colour blue or light blue and the second component pattern 540 in a dominant colour such as black, which can be made for example by offset-type printing; or alternatively, with pattern 540 printed on top of pattern 520 such that the pattern defining elements of 540 are visually recessive and pattern defining elements of 520 are visually dominant, which can be made for example by thermal-type printing.

In other examples, the dominant and recessive colours of the first and second component patterns of the information bearing device 100, 200, 300, 400, 500, are exchanged or swapped so that the dominant component pattern becomes a recessive component pattern and vice versa.

In other examples, the first and second component patterns of the information bearing device 100, 200, 300, 400, 500, are exchanged or swapped in the order of printing sequence so that the dominant component pattern becomes a recessive component pattern and vice versa.

In the examples herein, the one or both of the component patterns of the example information bearing devices may be printed at a relatively high resolution of 150 LPI or above. The 150 LPI resolution level has been selected as an example as this is the current prevailing resolution of staple copiers. When an information bearing device is attempted to be reproduced at a resolution higher than that of a staple copier, reproduction by a stapler copier would result in unacceptable quality clearly indicative of copying or tampering. A possibility to mitigate shortcomings of staple copiers is to extract the colour portions separately by scanning and to recombine the scanned colour patterns. Such a recombination process is error prone and will introduce errors such as those depicted in FIG. 1G.

An example information bearing device 600 depicted in FIG. 6 comprises a first component pattern 620 of FIG. 6A and a second component pattern 640 of FIG. 6B in overlap. The first component pattern 620 is formed by spatial distribution of a plurality of black pattern defining elements 622. The visually dominant black pattern defining elements 622 are spatially distributed according to a function, $f_{black}(x,y)$, and example distribution is shown in more detail in FIG.

6A1. The second component pattern 640 is formed by spatial distribution of a plurality of light blue pattern defining elements 642. The visually submissive light blue pattern defining elements 642 are spatially distributed according to a function, $f_{blue}(x,y)$, and example distribution is shown in more detail in FIG. 6B1. The example information bearing device 600 is formed by overlapping of the first component pattern 620 and the second component pattern 640 with their axes and origin aligned. The information bearing device 600 has an overlapped information bearing pattern having a size of 1.00 cm×1.00 cm and a resolution of at least 201 LPI. The excerpted portion 660, as depicted in FIG. 6X has a dimension of 0.2 cm×0.2 cm. These spatial values assume a printing resolution of 2400 dots-per-inch.

The first component pattern 620 is contained within a square boundary delineated by a reference pattern. The reference pattern comprises four example alignment members 650a, 650b, 650c, 650d which are distributed on four corners of the square boundary. Each example alignment member 650a, 650b, 650c, 650d comprises an outer square frame having a solid square outline and a solid inner square centred at the centre of the outer square frame, with the space between the outer square frame and inner square left blank to form a square frame of contrast. Distribution of alignment members at different locations, especially at corner locations, on the information bearing device facilitates alignment operation when the information bearing device is to be read or captured. Distributed alignment members would help to facilitate correction of data due to planar distortion.

The function $f_{black}(x,y)$ is in the form of a Fourier transform function and the function $F_{black}$ is a frequency domain function having frequency domain properties given by the following expression:

$$F_{black}(u,v) = \Sigma_{i=1}^{12} P_{i,black}(u,v)$$

Below is a set of example discrete data in frequency domain of this example:

| $P_{i,\,black}$ | $(u_i, v_i)$ | $(u_1, v_1)$ | $(u_2, v_2)$ | $(u_3, v_3)$ | $(u_4, v_4)$ | $(u_5, v_5)$ | $(u_6, v_6)$ |
|---|---|---|---|---|---|---|---|
| | | (79, 0) | (76, 20) | (68, 39) | (55, 55) | (39, 68) | (20, 76) |
| $P_{i,\,black}$ | $(u_7, v_7)$ | $(u_8, v_8)$ | $(u_9, v_9)$ | $(u_{10}, v_{10})$ | $(u_{11}, v_{11})$ | $(u_{12}, v_{12})$ | |
| | (0, 79) | (−21, 76) | (−40, 68) | (−56, 55) | (−69, 39) | (−77, 20) | |

The function $f_{blue}(x,y)$ is in the form of a Fourier transform function and the function $F_{blue}$ is a frequency domain function representing frequency domain properties given by the following expression:

$$F_{blue}(u,v) = \Sigma_{i=1}^{10} P_{i,blue}(u,v)$$

The set of discrete data in frequency domain is as follows:

| $P_{i,\,blue}$ | $(u_i, v_i)$ | $(u_1, v_1)$ | $(u_2, v_2)$ | $(u_3, v_3)$ | $(u_4, v_4)$ | $(u_5, v_5)$ | $(u_6, v_6)$ |
|---|---|---|---|---|---|---|---|
| | | (56, 0) | (52, 19) | (42, 35) | (28, 48) | (9, 55) | (−10, 55) |
| $P_{i,\,blue}$ | $(u_7, v_7)$ | $(u8, v8)$ | $(u_9, v_9)$ | | | | |
| | (−28, 48) | (−43, 35) | (−53, 19) | | | | |

An example information bearing device 700 depicted in FIG. 7 comprises a first component pattern and a second component pattern which are in overlap. The first component pattern is formed by spatial distribution of a plurality of visually submissive pattern defining elements 722 and the second component pattern is formed by spatial distribution of a plurality of visually dominant pattern defining elements 742. The construction and properties of the example information bearing device 700 and the corresponding first and second component patterns are similar to those of FIG. 1 and description in relation to the example information bearing device 100 and the corresponding first 120 and second 140 component patterns are incorporated herein by reference with corresponding numerals increased by 600 where appropriate.

When Fourier transform (FFT) is applied on the example information bearing device 700, a set of discrete data as depicted in FIG. 7X will be recovered. The discrete data are those due to the light blue visually submissive pattern defining elements 722 and those due to the red visually dominant pattern defining elements 742.

When Fourier transform (FFT) is applied on the visually dominant second component pattern 740 which is extracted from the example information bearing device 700, a set of discrete data as depicted in FIG. 7A1 will be recovered. The discrete data are those due solely to the red visually dominant pattern defining elements 742.

When Fourier transform (FFT) is applied on the visually submissive pattern 720A depicted in FIG. 7B, which is the portion of the visually submissive first component pattern 720 extractable from the example information bearing device 700, a set of discrete data as depicted in FIG. 7B1 will be recovered. The discrete data of FIG. 7B1 are those due to the visually submissive light blue pattern defining elements 722 and those due to the visually dominant red pattern defining elements 742, although those due to the visually dominant red pattern defining elements 742 are 'imprinted' or contaminated signals. As is apparent from FIG. 7B, the visually submissive pattern 720A depicted in FIG. 7B is a broken or incomplete version of the submissive first component pattern 720, but still carries the data originally embedded by the first component pattern 720.

In the example shown in FIG. 7, after Fourier transforming an information bearing device 700, the first coded message and the second coded message are extracted in the form of Fourier domain signal points, which may subject to further message interpretation. For instance, one or both of these coded messages may be used or interpreted as some authentication or identification information for the purpose of authenticating products or identifying products. The first coded message signal points are at 45-degree and 135-degree angles with respect to the horizontal axis. The second coded message signal points are at 0-degree and 90-degree angles with respect to the horizontal axis. As shown in FIG. 7A, the visually dominant information bearing image pattern elements 742, i.e. the red dots, can be extracted from 700 in full and the first coded message is extracted in the form of Fourier domain signal points. As shown in FIG. 7B, the visually submissive information bearing image pattern elements 722, i.e. the blue dots, can be extracted from 700 only as fragments. The Fourier domain signal points from the extraction are not only the signal points of the visually submissive second coded message but there are also "imprinted" signal points of the visually dominant first coded message because the fragments of the visually submissive information bearing image pattern elements bear a significant imprint of the visually dominant information bearing image pattern elements.

While the description has made reference to examples and figures, the example and figures are only to assist understanding and are not intended to restrict the scope of disclosure.

The invention claimed is:

1. An authentication device comprising
an information bearing device which comprises a first data bearing pattern and a second data bearing pattern, wherein said first data bearing pattern comprises a plurality of spatially distributed information bearing elements of a first type, said information bearing elements of the first type being spatially distributed to define the first data bearing pattern, the first data bearing pattern being characteristic of a first data set and the first data set relating to the first data bearing pattern by a first distribution rule; and
said second data bearing pattern comprises a plurality of spatially distributed information bearing elements of a second type, said information bearing elements of the second type being spatially distributed to define the second data bearing pattern, the second data bearing pattern being characteristic of a second data set and the second data set relating to the second data bearing pattern by a second distribution rule;
wherein at least a portion of said first data bearing pattern overlaps with at least a portion of said second data bearing pattern to form an overlapping region comprising an overlapped data bearing pattern, and wherein at least some information bearing elements of the first type and at least some information bearing elements of the second type in said overlapping data bearing pattern are joined or connected in abutment to form a plurality of overlapped information bearing elements; wherein said information bearing element of the first type has a first visual property and said information bearing element of the second type has a second visual property different to the first visual property, wherein one of said information bearing element of the first type or said information bearing element of the second type is a visually dominant information bearing element having a visually dominant visual property and the other one of said information bearing element of the first type or said information bearing element of the second type is a visually submissive or visually recessive information bearing element having a visually submissive or visually recessive visual property;
wherein said overlapped information bearing element comprises a first portion due to said information bearing element of the first type, a second portion due to said information bearing element of the second type, and a third portion due to merging or overlapping of said information bearing element of the first type and said information bearing element of the second type; and
wherein the third portion has the visually dominant visual property.

2. The authentication device according to claim 1, wherein the visually submissive or visually recessive information bearing elements are distributed according to a mathematical function comprising an amplitude distribution rule to correspond to a plurality of discrete frequency data.

3. The authentication device according to claim 1, wherein said first distribution rule and said second distribution rule are amplitude distribution functions characteristic of mathematical expressions having an oscillatory or sinusoidal property.

4. The authentication device according to claim 1, wherein said first distribution rule and said second distribution rule are mathematical expressions of different forms and/or having different parameters.

5. The authentication device according to claim 1, wherein said first distribution rule or second distribution rule is an amplitude distribution rule representable by Fourier functions or Bessel functions.

6. The authentication device according to claim 1, wherein said third portion includes a visible junction boundary, and said information bearing element of the first type and said information bearing element of the second type are in abutment or in seamed abutment along entirety of said visible junction boundary; and
wherein no visible junction boundary due to the visually submissive or visually recessive information bearing element is visible inside the visually dominant information bearing element.

7. The authentication device according to claim 1, wherein a complete visually dominant information bearing element is visually identifiable from said overlapped information bearing element and a partial visually submissive or recessive information bearing element is visually identifiable from said overlapped information bearing element.

8. The authentication device according to claim 1, wherein one of said information bearing element of the first type and said information bearing element of the second type is a color dominant information bearing element and another one of said information bearing element of the first type and said information bearing element of the second type is a color submissive or color recessive information bearing element; and
wherein the color submissive or color recessive information bearing element is covered by the color dominant information bearing element in the third portion.

9. The authentication device according to claim 1, wherein at least some said information bearing elements of the first type and/or at least said information bearing elements of the second type exist in isolation in said overlapped data bearing pattern as stand-alone information bearing elements; and
wherein the visually submissive or visually recessive information bearing element form a recessive information bearing pattern and the stand-alone information bearing elements contain authentication information or provide information for reconstruction of the recessive information bearing pattern.

10. The authentication device according to claim 1, wherein relative orientations between said information bearing element of the first type and said information bearing elements of the second type among plurality of said overlapped information bearing elements are non-uniform or different.

11. The authentication device according to claim 1, wherein said overlapped information bearing elements define hybrid information bearing elements, and a plurality of said hybrid information bearing elements is grouped to form a hybrid pattern.

12. The authentication device according to claim 1, wherein said information bearing elements of the first type has a first color and said information bearing elements of the second type has a second color different to the first color.

13. The authentication device according to claim 1, wherein said information bearing elements of the first type has a first grey scale and said information bearing elements of the second type has a second grey scale different to the first grey scale.

14. The authentication device according to claim 1, wherein said information bearing elements are distributed at above 150 Lines-per-inch.

15. The authentication device according to claim 1, wherein said first distribution rule is representable as a first mathematical expression or a first computational expression, and/or said second distribution rules is representable as a second mathematical expression or a second computational expression; and wherein said first mathematical expression, said first computational expression, said second mathematical expression, and said second computational expression is to correlate a discrete data or a set of discrete data with a set of distributed parameters, said distributed parameters being representable as information bearing elements of said data bearing pattern and having a one-to-one correlation with said information bearing elements, and the number of said distributed parameters far exceeds or being substantially higher than the number of said discrete data.

16. The authentication device according to claim 1, wherein visually non-dominant or visually submissive information bearing elements are distributed to form a visually submissive pattern and visually dominant information bearing elements are distributed to form a visually dominant pattern, and a region of overlap is formed where said visually submissive information bearing element and said visually dominant information bearing element are joined, and wherein the visually submissive information bearing element is not visible to the naked eyes, or is substantially not visible, or is less visually distinguishable in the region of overlap.

17. The authentication device according to claim 1, wherein visually non-dominant or visually submissive information bearing elements are distributed to form a visually submissive pattern and visually dominant information bearing elements are distributed to form a visually dominant pattern, and wherein extraction of the visually submissive pattern from the information bearing device provides information characteristic of the visually dominant pattern, including information on a coded message associated with the visually dominant pattern.

18. The authentication device according to claim 1, wherein one of said information bearing elements of the first type or said information bearing elements of second type is visually dominant in color or grey scale brightness, and the other one of the information bearing elements of the first type or second type is visually non-dominant or visually submissive in color or grey scale brightness.

19. An authentication device comprising an information bearing device, wherein the information bearing device comprises a first data bearing pattern and a second data bearing pattern, wherein said first data bearing pattern comprises a plurality of spatially distributed information bearing elements of a first type, said information bearing elements of the first type being spatially distributed to define the first data bearing pattern, the first data bearing pattern being characteristic of a first data set and the first data set relating to the first data bearing pattern by a first distribution rule; and said second data bearing pattern comprises a plurality of spatially distributed information bearing elements of a second type, said information bearing elements of the second type being spatially distributed to define the second data bearing pattern, the second data bearing pattern being characteristic of a second data set and the second data set relating to the second data bearing pattern by a second distribution rule;

wherein at least a portion of said first data bearing pattern overlaps with at least a portion of said second data bearing pattern to form an overlapping region comprising an overlapped data bearing pattern, and wherein at least some information bearing elements of the first type and at least some information bearing elements of the second type in said overlapping data bearing pattern are joined or connected in abutment to form a plurality of overlapped information bearing elements, and wherein one or both of the first and second coded messages carries authentication information;

wherein one of the first data bearing pattern or the second data bearing pattern is a visually submissive data bearing pattern and the other one of the first data bearing pattern or the second data bearing pattern is a visually dominant data bearing pattern; and wherein the overlapping region is visually dominant by visually dominant data bearing pattern, and authentication information is contained in the visually submissive data bearing pattern.

20. A method of forming a copy resistant authentication device, wherein the authentication device comprises an information bearing device comprising a first data bearing pattern and a second data bearing pattern, wherein said first data bearing pattern comprises a plurality of spatially distributed information bearing elements of a first type, said information bearing elements of the first type being spatially distributed to define the first data bearing pattern, the first data bearing pattern being characteristic of a first data set and the first data set relating to the first data bearing pattern by a first distribution rule; and said second data bearing pattern comprises a plurality of spatially distributed information bearing elements of a second type, said information bearing elements of the second type being spatially distributed to define the second data bearing pattern, the second data bearing pattern being characteristic of a second data set and the second data set relating to the second data bearing pattern by a second distribution rule;

wherein at least a portion of said first data bearing pattern overlaps with at least a portion of said second data bearing pattern to form an overlapping region comprising an overlapped data bearing pattern, and wherein at least some information bearing elements of the first type and at least some information bearing elements of the second type in said overlapping data bearing pattern are joined or connected in abutment to form a plurality of overlapped information bearing elements, and wherein the method comprises:

a. forming a first data bearing pattern in a first area, the first data bearing pattern comprising spatially distributed information bearing elements of a first type, said information bearing elements of the first type being distributed according to a first distribution rule to represent a first set of data; and b. forming a second data bearing pattern in the first area, the second data bearing pattern comprising spatially distributed information bearing elements of a second type, said information bearing elements of the second type being distributed according to a second distribution rule to represent a second set of data; wherein c. at least a portion of said first data bearing pattern overlaps with at least a portion of said second data bearing pattern to form an overlapping region comprising an overlapped data bearing pattern; and wherein d. one of said first data bearing pattern or said second data bearing pattern is formed as a visually dominant data bearing pattern and the other one of said first data bearing pattern or said second data bearing pattern is formed as a visually submissive or recessive data bearing pattern such that the entirety of said visually dominant data bearing pattern is visually identifiable from said overlapped data bearing pattern and portions of said visually submissive data bearing pattern which are in overlap with the said visually dominant data bearing pattern is not visually identifiable from said overlapped data bearing pattern.

\* \* \* \* \*